United States Patent
Monden

(10) Patent No.: US 10,009,945 B2
(45) Date of Patent: Jun. 26, 2018

(54) COMMUNICATION DEVICE, COMMUNICATION DEVICE CONTROL METHOD, AND DISPLAY SYSTEM

(71) Applicant: CANON KABUSHIKI KAISHA, Tokyo (JP)

(72) Inventor: Kazuhiro Monden, Inagi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 155 days.

(21) Appl. No.: 15/072,768

(22) Filed: Mar. 17, 2016

(65) Prior Publication Data

US 2016/0278135 A1    Sep. 22, 2016

(30) Foreign Application Priority Data

Mar. 19, 2015   (JP) .................................. 2015-056737

(51) Int. Cl.
 *H04W 76/10* (2018.01)
 *H04N 9/31* (2006.01)

(52) U.S. Cl.
 CPC .......... *H04W 76/10* (2018.02); *H04N 9/3147* (2013.01)

(58) Field of Classification Search
 CPC .................................................. H04L 61/6077
 See application file for complete search history.

(56) References Cited

U.S. PATENT DOCUMENTS

| | | | | |
|---|---|---|---|---|
| 2004/0267891 A1* | 12/2004 | Hoeye | ................... | G03B 19/00 709/206 |
| 2005/0036509 A1* | 2/2005 | Acharya | ............. | H04L 63/0428 370/466 |
| 2006/0098174 A1* | 5/2006 | Ohuchi | ................. | H04M 3/567 353/122 |
| 2008/0158438 A1* | 7/2008 | Maeda | ..................... | H04N 5/74 348/744 |
| 2009/0043846 A1* | 2/2009 | Inoue | ........................ | G06F 3/14 709/204 |
| 2010/0005150 A1* | 1/2010 | Kubota | ................. | G06F 3/1454 709/212 |
| 2010/0106844 A1* | 4/2010 | Ota | ..................... | H04L 12/6418 709/228 |

(Continued)

FOREIGN PATENT DOCUMENTS

JP    2014-127915 A    7/2014

*Primary Examiner* — Kashif Siddiqui
(74) *Attorney, Agent, or Firm* — Cowan, Liebowitz & Latman, P.C.

(57) ABSTRACT

A communication device is provided, which includes: a receiver that receives, in a case where the communication device is already connected to a first information processing device by a first connection method, a connection request from a second information processing device; and a controller that performs control such that, (1) in a case where a connection method designated in the connection request is a second connection method different from the first connection method, connection based on the connection request is not performed and that, (2) in a case where the connection method designated in the connection request is the first connection method, connection based on the connection request is performed, wherein the receiver receives image data from an information processing device connected to the communication device.

10 Claims, 9 Drawing Sheets

(56) References Cited

U.S. PATENT DOCUMENTS

| | | | |
|---|---|---|---|
| 2011/0238808 A1* | 9/2011 | Natori | H04N 9/3102 |
| | | | 709/223 |
| 2013/0272224 A1* | 10/2013 | Ogawara | H04W 76/021 |
| | | | 370/329 |
| 2014/0092781 A1* | 4/2014 | Tan | H04W 4/16 |
| | | | 370/259 |
| 2014/0115173 A1* | 4/2014 | Yukumoto | H04L 63/10 |
| | | | 709/227 |
| 2015/0058948 A1* | 2/2015 | Miyamoto | G06F 21/62 |
| | | | 726/7 |
| 2016/0323826 A1* | 11/2016 | Xie | H04W 52/0225 |
| 2017/0280327 A1* | 9/2017 | Masuoka | H04W 12/08 |

* cited by examiner

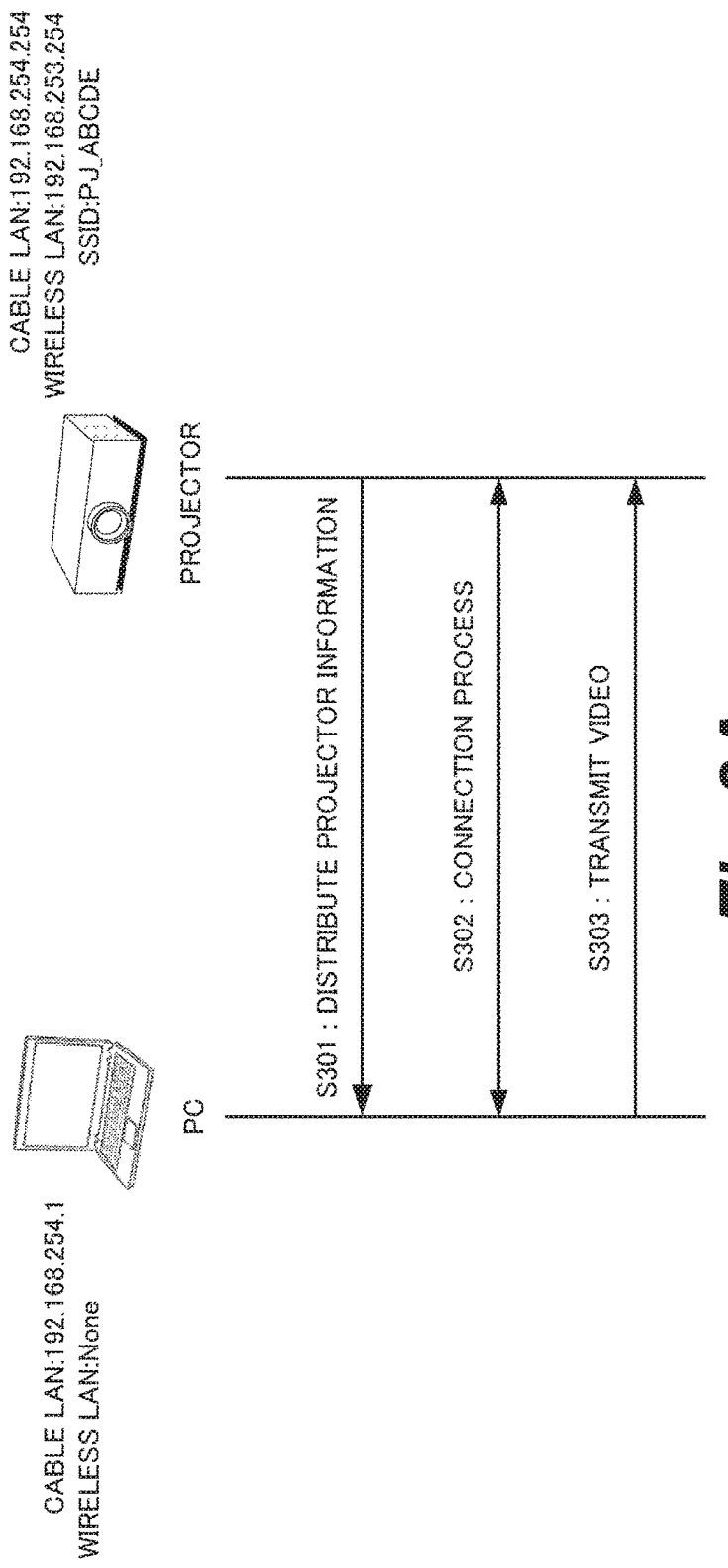

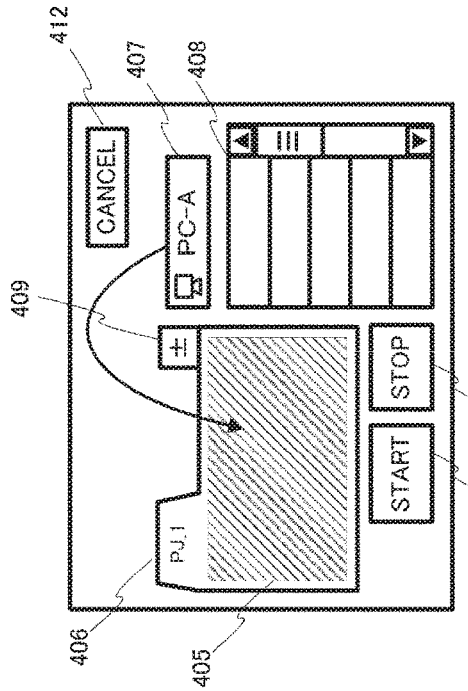
Fig.4C
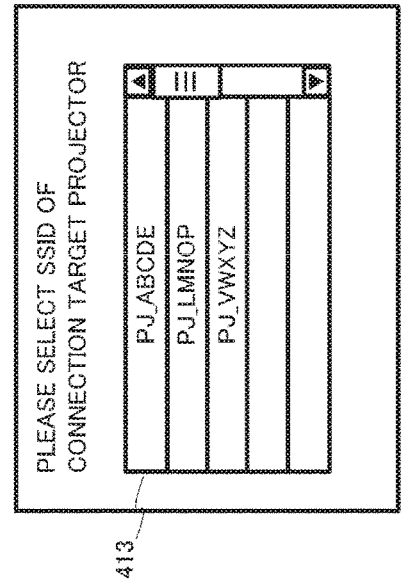
Fig.4D
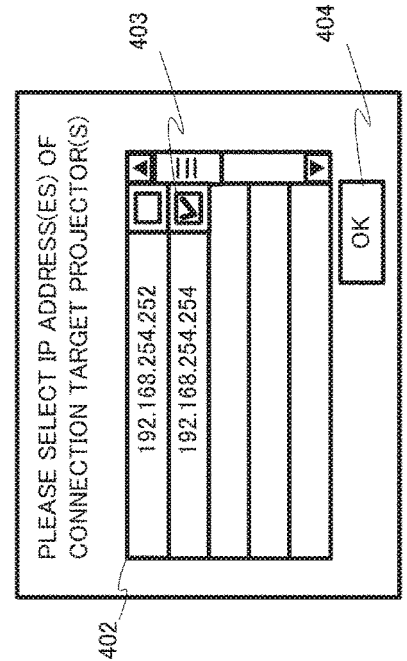
Fig.4A
Fig.4B

```
IP ADDRESS
    CABLE LAN : 192.168.254.254
    WIRELESS LAN : 192.168.253.254
    SSID : PJ_ABCDE

ACCEPTABLE CONNECTION METHOD
    INFRASTRUCTURE CONNECTION : OK
    WIRELESS DIRECT CONNECTION : OK
```
*Fig.5A*

```
IP ADDRESS
    CABLE LAN : 192.168.254.254
    WIRELESS LAN : INACTIVE

ACCEPTABLE CONNECTION METHOD
    INFRASTRUCTURE CONNECTION : OK
    WIRELESS DIRECT CONNECTION : NG
```
*Fig.5D*

```
IP ADDRESS
    CABLE LAN : 192.168.254.254
    WIRELESS LAN : 192.168.253.254
    SSID : PJ_ABCDE

ACCEPTABLE CONNECTION METHOD
    INFRASTRUCTURE CONNECTION : OK
    WIRELESS DIRECT CONNECTION : NG
```
*Fig.5B*

```
IP ADDRESS
    CABLE LAN : INACTIVE
    WIRELESS LAN : 192.168.253.254
    SSID : PJ_ABCDE

ACCEPTABLE CONNECTION METHOD
    INFRASTRUCTURE CONNECTION : NG
    WIRELESS DIRECT CONNECTION : OK
```
*Fig.5E*

```
IP ADDRESS
    CABLE LAN : 192.168.254.254
    WIRELESS LAN : 192.168.253.254
    SSID : PJ_ABCDE

ACCEPTABLE CONNECTION METHOD
    INFRASTRUCTURE CONNECTION : NG
    WIRELESS DIRECT CONNECTION : OK
```
*Fig.5C*

COMMUNICATION DEVICE, COMMUNICATION DEVICE CONTROL METHOD, AND DISPLAY SYSTEM

BACKGROUND OF THE INVENTION

Field of the Invention

The present invention relates to a communication device, a communication device control method, and a display system.

Description of the Related Art

In general, a personal computer (PC) and a projector transmit and receive image signals based on analog connection which uses an analog RGB cable. However, analog connection has a problem that it takes time and labor and it is difficult to establish the connection from a remote site and with a plurality of PCs. Due to these reasons, a network-based screen transfer system that connects a PC and a projector via a network is gathering attraction.

In this network-based screen transfer system, a function of projecting a video in one PC to a plurality of projectors simultaneously and a function of projecting videos in a plurality of PCs to one projector in a large screen layout are realized. Moreover, Japanese Patent Application Publication No. 2014-127915 discloses a method of managing information on a network group (hereinafter referred to as a session) made up of PCs and projectors and performing adding and removal of a projector that forms the session.

However, in such a network-based screen transfer system, an access point function is provided to a projector-side wireless LAN network IF itself so that the projector-side wireless LAN network IF establishes a network connection directly with a PC-side wireless LAN network IF (hereinafter this connection will be referred to as wireless direct connection). According to this method, a local network environment can be created by a PC and a projector only, and network-based screen transfer can be realized without other network devices such as a router, a hub, and an access point.

Since the projector does not perform routing between the cable LAN network IF and the wireless LAN network IF, a local network formed by wireless direct connection can be separated from a network on the cable LAN network IF side. For example, even when an intra-network is constructed on the cable LAN network IF side, wireless direct connection can be configured such that users such as guests who do not have an access right to the intra-network can use the wireless direct connection.

SUMMARY OF THE INVENTION

However, the following problems occur when a cable LAN network IF and a wireless LAN network IF are mounted on a projector. Referring to FIG. 1, first a PC 100a establishes connection via a cable LAN network IF of a projector 200a to form a session. Subsequently, a PC 100b establishes connection between its own wireless LAN network IF and a wireless LAN network IF of a projector 200b and participates in the session. When the PC 100a adds the projector 200b to the session in this state, the PC 100b cannot establish connection with the projector 200b. The session information (belonging devices are the PC 100a, the PC 100b, the projector 200a, and the projector 200b) possessed by the PC 100a is different from the session information (belonging devices are the PC 100a, the PC 100b, and the projector 200a) possessed by the PC 100b. In such a state, when the PC 100a performs control to project the screen of the PC 100b to the projector 200b, for example, the PC 100b cannot execute the projection since the PC 100b cannot communicate with the projector 200b.

Thus, an object of the present invention is to suppress the occurrence of a state in which a communication device and an information processing device cannot communicate with each other in a display system in which a plurality of communication devices and a plurality of information processing devices are connected by a network.

According to a first aspect of the present invention, there is provided a communication device which is connected to a network and can communicate with an information processing device, the communication device including: a receiver that, in a case where the communication device is already connected to a first information processing device by a first connection method, receives a connection request from a second information processing device; and a controller that performs control such that, (1) in a case where a connection method designated in the connection request is a second connection method different from the first connection method, connection based on the connection request from the second information processing device is not performed and that, (2) in a case where the connection method designated in the connection request is the first connection method, connection based on the connection request from the second information processing device is performed, wherein the receiver receives image data from an information processing device connected to the communication device.

According to a second aspect of the present invention, there is provided a method of controlling a communication device which is connected to a network and can communicate with an information processing device, the method including: receiving, in a case where the communication device is already connected to a first information processing device by a first connection method, a connection request from a second information processing device; performing control such that, (1) in a case where a connection method designated in the connection request is a second connection method different from the first connection method, connection based on the connection request from the second information processing device is not performed and that, (2) in a case where the connection method designated in the connection request is the first connection method, connection based on the connection request from the second information processing device is performed; and receiving image data from an information processing device connected to the communication device.

According to a third aspect of the present invention, there is provided a display system in which an information processing device and a communication device are connected by a network, the communication device including: a receiver that, in a case where the communication device is already connected to a first information processing device by a first connection method, receives a connection request from a second information processing device; and a controller that performs control such that, (1) in a case where a connection method designated in the connection request is a second connection method different from the first connection method, connection based on the connection request from the second information processing device is not performed and that, (2) in a case where the connection method designated in the connection request is the first connection method, connection based on the connection request from the second information processing device is performed, wherein the receiver receives image data from an information processing device connected to the communication device, and each information processing device includes a transmitter that transmits a connection request to the communication device and transmits image data to the connected communication device.

According to a fourth aspect of the present invention, there is provided a non-transitory computer-readable storage medium storing a computer-executable program for causing a computer to function as following units of a communication device, which is connected to a network and can communicate with an information processing device, including: a receiver that, in a case where the communication device is already connected to a first information processing device by a first connection method, receives a connection request from a second information processing device; and a controller that performs control such that, (1) in a case where a connection method designated in the connection request is a second connection method different from the first connection method, connection based on the connection request from the second information processing device is not performed and that, (2) in a case where the connection method designated in the connection request is the first connection method, connection based on the connection request from the second information processing device is performed, wherein the receiver receives image data from an information processing device connected to the communication device.

According to the present invention, it is possible to suppress the occurrence of a state in which a communication device and an information processing device cannot communicate with each other in a display system in which a plurality of communication devices and a plurality of information processing devices are connected by a network.

Further features of the present invention will become apparent from the following description of exemplary embodiments with reference to the attached drawings.

BRIEF DESCRIPTION OF THE DRAWINGS

FIGS. 3A and 3B are communication flowcharts of a PC and a projector;
FIGS. 4A to 4D illustrate a GUI of a PC;
FIGS. 5A to 5E are diagrams illustrating an OSD on a projector projection screen.

DESCRIPTION OF THE EMBODIMENTS

Hereinafter, an embodiment of the present invention will be described in detail with reference to the drawings, but this invention is not limited to the following embodiment. Moreover, an embodiment of the present invention illustrates a preferred mode of the invention and does not limit the scope of the invention.

Embodiment 1

Figure 1:
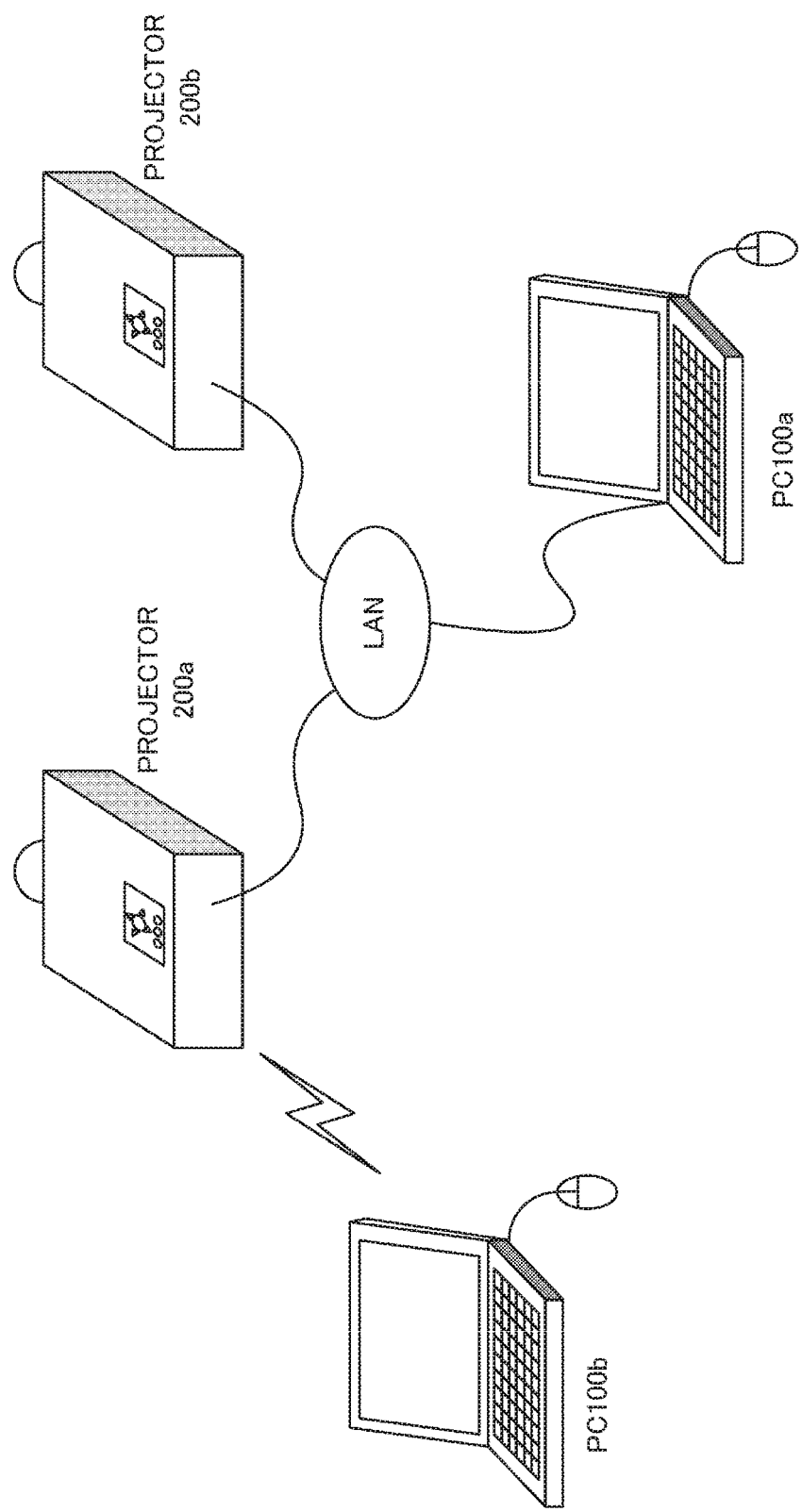
FIG. 1 is a conceptual diagram of a network-based screen transfer system.
Figure 2:
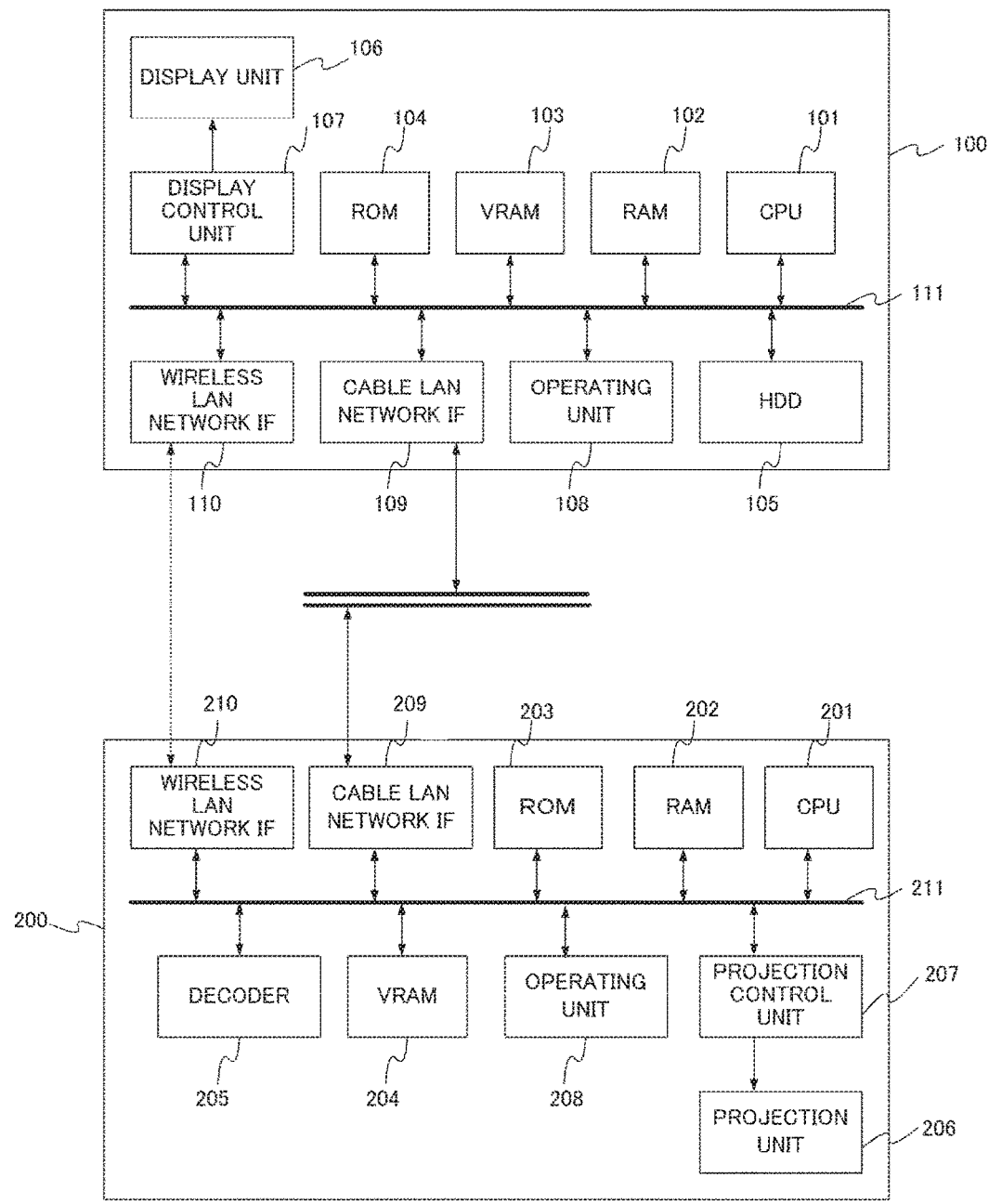
FIG. 2 is a hardware configuration diagram of a PC and a projector.

Hereinafter, a main configuration of a PC 100 and a projector 200 that forms a display system of Embodiment 1 will be described with reference to FIG. 2. After the configuration is described, a basic operation will be described. The display system of Embodiment 1 is made up of a plurality of information processing devices (the PCs 100) and one or a plurality of communication devices (the projectors 200) capable of establishing communication channels according to a plurality of connection methods by being connected to each other by a network. In FIG. 2, only one PC 100 and only one projector 200 are illustrated to prevent the drawing from being complicated. In this network, a display device and an information processing device can establish communication channels according to a plurality of connection methods. In Embodiment 1, although a cable LAN interface and a wireless LAN interface are illustrated as examples of the plurality of connection methods, the connection method is not limited to this. For example, wireless communication standards such as infrared or Bluetooth (registered trademark) can be used as the connection method, and wired communication standards such as USB or HDMI (registered trademark) can be used as the connection method.

First, a main configuration of the PC 100 will be described.

A central processing unit (CPU) 101 controls the entire PC 100.

A random access memory (RAM) 102 is a main memory that stores data. The RAM 102 is mainly used as various data storage areas such as an area for storing or loading a program executed by the CPU 101 or a work area of a program in execution.

A video RAM (VRAM) 103 is used as an area for storing image data to be displayed on a display unit 106 (described later). If the processing speed of the RAM 102 is sufficiently high, the VRAM 103 may be the same as the RAM 102.

A read-only memory (ROM) 104 stores a boot program that the CPU 101 executes during initialization. The boot program performs a process of loading an operating system (OS) recorded in a hard disk drive (HDD) 105 (described later) onto the RAM 102 and activating the OS.

The HDD 105 is used for storing data and programs such as an application program or an OS.

The display unit 106 displays an image instructed by a display control unit 107 (described later). The display unit 106 is a liquid crystal panel or an organic electro-luminescence (EL) panel, for example. The display unit 106 is not limited to these examples but may be a cathode-ray tube (CRT), a micro electro mechanical system (MEMS) shutter display, or the like.

The display control unit 107 performs a process of reading the image data stored in the VRAM 103 and displaying the image data on the display unit 106.

An operating unit 108 receives an input operation from a user. The operating unit 108 includes a keyboard, a mouse, a touch panel, and the like and the input operations of these components are transmitted to the CPU 101.

A cable LAN network interface (IF) 109 performs communication with an external device, specifically the projector 200.

A wireless LAN network IF 110 performs communication with an external device, specifically the projector 200.

An internal bus 111 connects the respective processing blocks described above.

A basic operation of the PC according to Example 1 includes the following steps. That is, a screen transfer program running on the CPU 101 of the PC controls the display control unit 107 to capture image data being displayed by the display unit 106. The screen transfer program running on the CPU 101 encodes the captured image data into a predetermined format that the projector 200 can recognize. The screen transfer program running on the CPU 101 transmits the encoded image data to the projector 200 via the cable LAN network IF 109 or the wireless LAN network IF 110. Here, the screen transfer program includes a graphical user interface (GUI). By using the GUI, the screen transfer program can receive various operations of the user, such as a "projector connection method selection process," a "screen transfer destination projector selection process," or a "screen transfer start/stop process" via the operating unit 108.

Next, a main configuration of the projector 200 will be described.

A CPU 201 controls the entire projector 200.

A RAM 202 is a main memory that stores data. The RAM 202 is mainly used as various data storage areas such as an area for storing or loading a program executed by the CPU 101 or a work area of a program in execution.

In a ROM 203, data such as a program or a parameter necessary for the projector 200 to operate is stored in advance and the CPU 201 operates according to the content stored in the ROM 203.

A VRAM 204 is used as an area for storing image data to be projected by a projection unit 206 (described later).

A decoder 205 decodes the image data received from the PC 100 when the image data is encoded according to an encoding method such as JPEG, for example.

The projection unit 206 displays image data instructed by a projection control unit 207 (described later). Specifically, the projection unit 206 includes a liquid crystal panel, a lens, and a light source.

The projection control unit 207 performs a process of reading the image data stored in the VRAM 204 and outputting the image data to the projection unit 206.

An operating unit 208 receives an input operation from a user. The operating unit 208 includes a button provided on a casing, a remote control signal receiver that receives the user's operation from a remote controller (not illustrated), and the like, and information on the input operations of these components is transmitted to the CPU 201.

A cable LAN network IF 209 performs communication with an external device, specifically the PC 100.

A wireless LAN network IF 210 has an access point function and performs a process of issuing a beacon signal including its own service set identifier (SSID) and allocating an IP address to a wireless LAN client device. Moreover, the wireless LAN network IF 210 performs communication with an external device, specifically the PC 100.

An internal bus 211 connects the respective processing blocks described above.

A basic operation of the projector 200 according to Example 1 involves receiving image data from the PC 100 (an information processing device) of which the communication channel with the projector 200 (a display device) has been established and displaying an image. Specifically, the CPU 201 receives the image data transmitted from the PC 100 via the cable LAN network IF 209 or the wireless LAN network IF 210 according to the program stored in the ROM 203. The CPU 201 loads the received image data into a format that the projector 200 can display with the aid of the decoder 205 and stores the image data in the VRAM 204. The CPU 201 controls the projection control unit 207 and projects and displays an image based on the image data with the aid of the projection unit 206.

Here, a characteristic operation of the screen transfer system of Embodiment 1 will be described.

As described above, according to the network-based screen transfer system of the present invention, it is possible to maintain a state in which an information processing device and a display controller can communicate with each other by unifying a connection method within a network group that forms the screen transfer system.

Figure 3B:
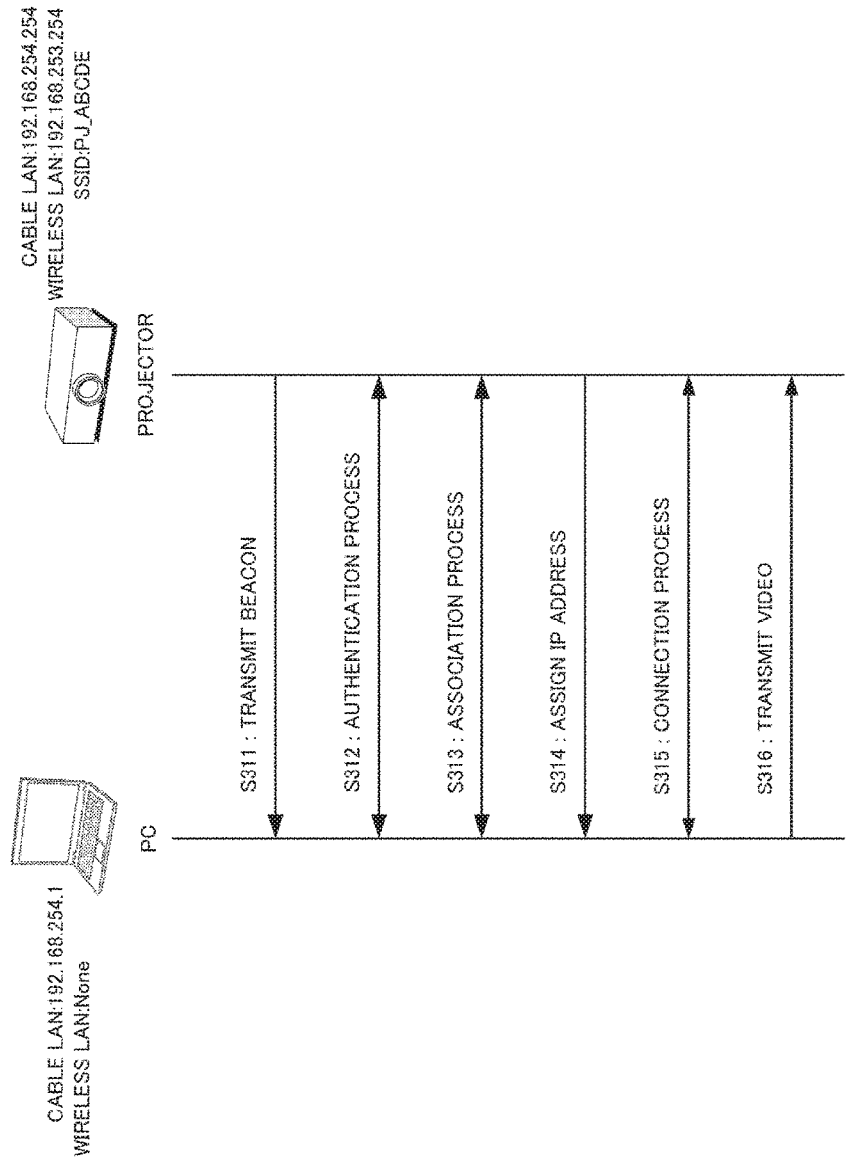

First, with reference to the communication flowcharts of FIGS. 3A and 3B, a sequence in which a PC and a projector establishes a communication channel in an initial state in which no communication channel is established between the PC and the projector will be described for two connection methods. In this example, the two connection methods are "infrastructure connection" which uses a cable LAN interface and "wireless direct connection" which uses a wireless LAN interface.

In Embodiment 1, it is assumed that the PC 100 includes the cable LAN network IF 109 and the wireless LAN network IF 110 as illustrated in FIG. 2. It is also assumed that as illustrated in FIG. 2 the projector 200 includes the cable LAN network IF 209 and the wireless LAN network IF 210. For further simplification, it is assumed that "192.168.254.1" is allocated to the cable LAN network IF 109 of the PC 100 as an IP address, and an IP address is not allocated to the wireless LAN network IF 210. It is assumed that "192.168.254.254" is allocated to the cable LAN network IF 209 of the projector 200 as an IP address. Further, it is assumed that "192.168.253.254" is allocated to the wireless LAN network IF 210 as an IP address.

It is assumed that the wireless LAN network IF 210 includes an access point function as described above and "PJ_ABCDE" is allocated to the wireless LAN network IF 210 as a SSID of the access point. A wireless LAN network IF having an access point function generally switches between an "access point mode" in which the wireless LAN network IF acts as an access point and a "client mode" in which the wireless LAN network IF acts as a wireless LAN client. However, in Embodiment 1, to simplify the description, it is assumed that the wireless LAN network IF operates in the "access point mode" only.

Moreover, it is assumed that the cable LAN network IF 109 of the PC 100 and the cable LAN network IF 209 of the projector 200 are connected on the same network segment and can communicate on a TCP/IP level.

In Embodiment 1, a connection method of establishing a communication channel for allowing the PC 100 to transfer a screen to the projector 200 with the aid of the cable LAN network IF 109 of the PC 100 and the cable LAN network IF 209 of the projector 200 will be referred to as "infrastructure connection." Moreover, a connection method of establishing a communication channel for allowing the PC 100 to transfer a screen to the projector 200 with the aid of the wireless LAN network IF 110 of the PC 100 and the wireless LAN network IF 210 of the projector 200 will be referred to as "wireless direct connection." It is assumed that the screen transfer program running on the PC 100 is executed on the CPU 101, presents a GUI to a user via the display unit 106, and receives an operation from the user via the operating unit 108.

As a first example, a communication process flow in which the PC 100 transfers a screen to the projector 200 according to "infrastructure connection" will be described with reference to FIG. 3A.

Upon receiving an activation instruction from the user, the screen transfer program running on the PC 100 displays a GUI illustrated in FIG. 4A and waits for the input of an instruction as to whether a communication channel with the projector is to be established according to "infrastructure connection" or "wireless direct connection." In this example, it is assumed that the user presses a button 400 to input an instruction to establish the communication channel with the projector according to "infrastructure connection."

The projector in an initial state before the communication channel is established presents an IP address allocated thereto by projecting an on-screen display (OSD) illustrated in FIG. 5A. In Embodiment 1, "192.168.254.254" is allocated to the cable LAN network IF and "192.168.253.254" is allocated to the wireless LAN network IF. Moreover, "PJ_ABCDE" is allocated as the SSID of the access point of the wireless LAN network IF. Further, in an initial state in which no communication channel is established between an information processing device (the PC) and a display device (the projector), the information on a plurality of connection methods with which a communication channel can be established between the information processing device and the display device may be displayed in the OSD. In the example of FIG. 5A, information indicating that the projector can be connected according to both connection methods of "infrastructure connection" and "wireless direct connection" is also presented.

Returning to FIG. 3A, in S301, the CPU 201 of the projector 200 controls the cable LAN network IF 209 to distribute projector information including at least the IP address allocated to the cable LAN network IF 209 to the network. In this example, the IP address is 192.168.254.254. The CPU 101 of the PC 100 receives the projector information via the cable LAN network IF 109 and displays a GUI illustrated in FIG. 4B according to this information.

The GUI illustrated in FIG. 4B includes an area 402 in which the IP addresses are displayed in a list form based on the received projector information. The user can input an instruction to designate a projector to which a screen is to be transferred by clicking on a checkbox 403 and pressing an OK button 404.

In this example, to simplify the description, it is assumed that one projector 200 to which the IP address "192.168.254.254" is allocated is selected.

In S302, the PC 100 and the projector 200 performs a connection process for establishing a screen transfer communication channel. Specifically, the CPU 101 of the PC 100 transmits a connection request to the cable LAN network IF 209 of the projector 200 by controlling the cable LAN network IF 109. The projector 200 having received the connection request performs a connection reception process illustrated in FIG. 6A with the aid of the CPU 201 and control the cable LAN network IF 209 to transmit a response to the network IF which transmitted the connection request.

Figure 6A:
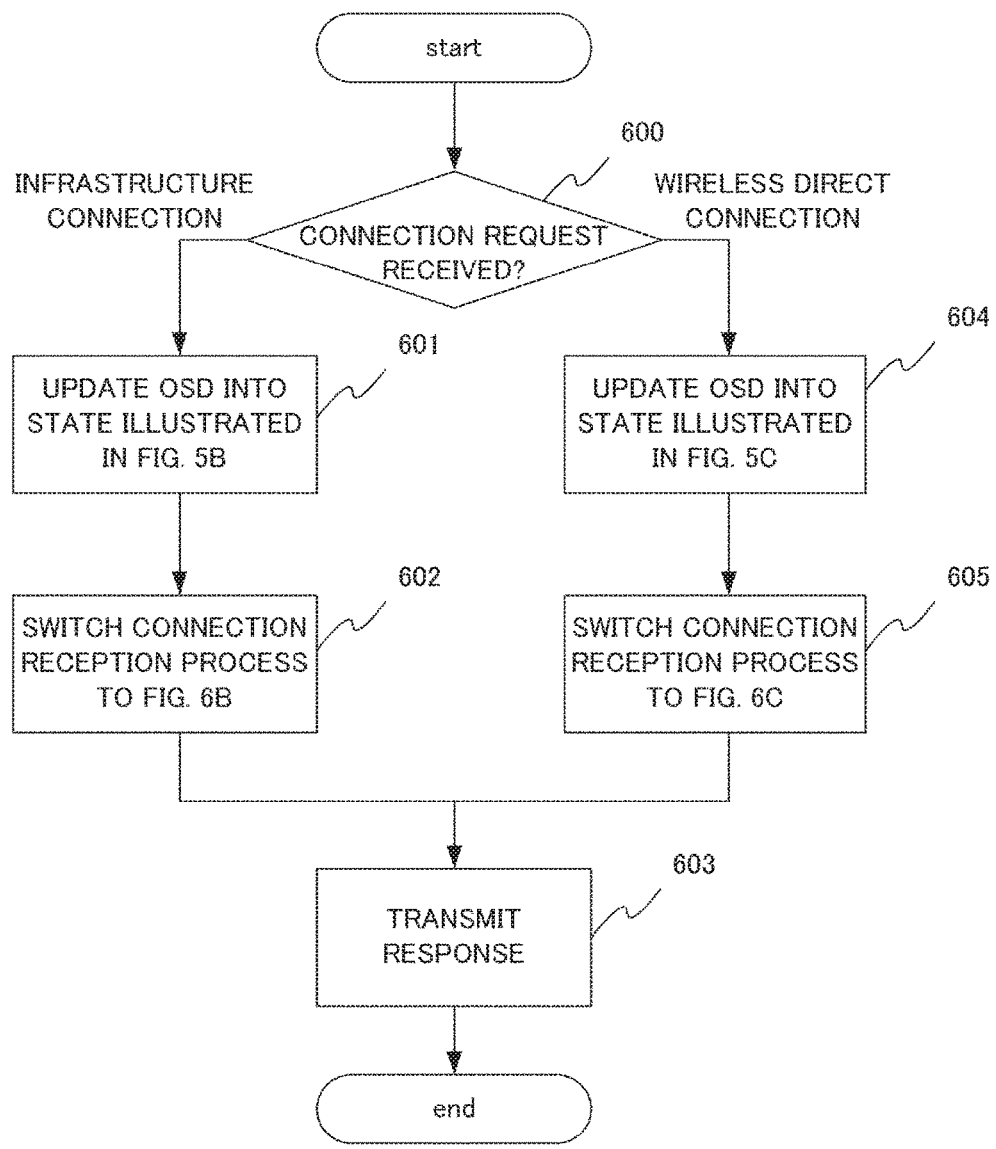
FIGS. 6A to 6C are flowcharts of a connection reception process of a projector.

Here, the control of a connection request in an initial state in which no communication channel is established between an information processing device (the PC) and a display device (the projector) connected to a network will be described with reference to FIG. 6A. When a display device has received a connection request to establish a communication channel with the display device from an information processing device in an initial state, the display device establishes a communication channel between the display device and the information processing device which transmitted the connection request according to a connection method designated in the connection request. That is, when a projector has received a connection request according to "infrastructure connection" from a PC in an initial state, the projector established a communication channel according to infrastructure connection. When the projector has received a connection request according to "wireless direct connection," the projector establishes a communication channel according to wireless direct connection. Hereinafter, the process of receiving the connection request from the PC in the initial state of the projector will be described in detail.

First, in S600, if the cable LAN network IF 209 has received the connection request, the CPU 201 of the projector 200 determines that the connection request from the PC 100 is received according to "infrastructure connection" and proceeds to S601. If the wireless LAN network IF 210 has received the connection request, it is determined that the connection request from the PC 100 is received according to "wireless direct connection" and the flow proceeds to S604. In this example, it is assumed that the flow proceeds to S601 since "infrastructure connection" is received.

In S601, the CPU 201 of the projector 200 projects an OSD illustrated in FIG. 5B by controlling the projection control unit 207 and proceeds to S602. With the information displayed in the OSD of FIG. 5B, it is possible to present information that the connection method acceptable to the projector is "infrastructure connection" only. In this example, the OSD of FIG. 5B is displayed when a display device (the projector) has received a connection request from an information processing device (the PC) according to infrastructure connection before the display device and the information processing device establish connection according to infrastructure connection. However, the OSD of FIG. 5B may be displayed as information on a connection method applicable to a device which is not connected to a communication channel when the communication channel is already established between a display device and an information processing device on a network according to infrastructure connection.

Figure 6B:
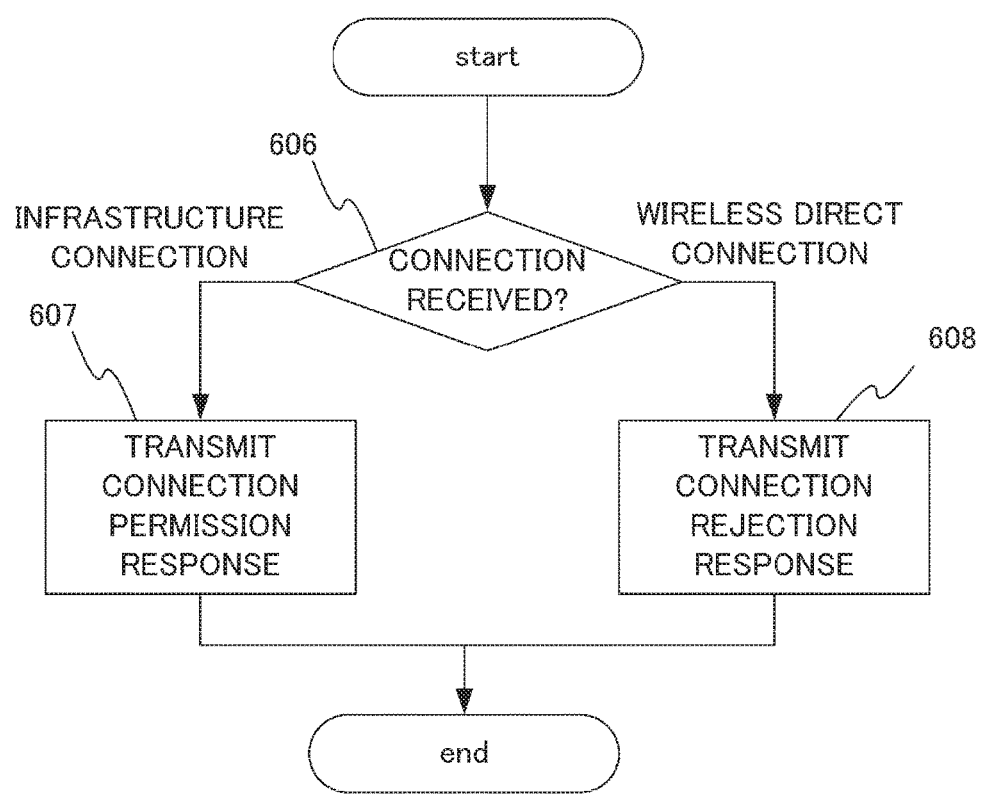

In S602, the CPU 201 of the projector 200 performs control to switch a connection reception process to the process of FIG. 6B when a connection request is received from a PC in the future. In S603, the CPU 201 transmits a response to accept connection as to the connection request received from the PC in S600 to a network IF (in this example, the cable LAN network IF 109 of the PC 100) that transmitted the connection request and completes the process. With the above process, a logical group (a session) for performing a screen transfer operation is established between the PC 100 and the projector 200.

The description will be continued by returning to FIGS. 3A and 3B. After a connection process is completed in S302, the CPU 101 of the PC 100 displays a GUI illustrated in FIG. 4C.

The GUI illustrated in FIG. 4C includes a layout area 405 in which a projection layout can be set, a tab 406 for changing a target projector of which the projection layout is set, and an area 407 in which information of the PC itself is displayed. The GUI of FIG. 4C further includes a list 408 in which information of the other PCs belonging to the session is displayed and a button 409 for adding or removing a projector to or from the session. The GUI of FIG. 4C further includes a button 410 for issuing an instruction to start a screen transfer operation to a projector being selected by the tab 406, a button 411 for issuing an instruction to stop the screen transfer operation, and a button 412 for issuing an instruction to remove the PC from the session. Since the processes of the GUI are not the main idea of the present invention, the details thereof will not be provided (see Japanese Patent Application Publication No. 2014-127915).

Returning to FIG. 3A, in S303, the PC 100 having receive the instruction to start a screen transfer operation from the user performs a process of capturing, encoding, and transmitting image data as described above. The projector 200 performs a process of receiving, decoding, and projecting the image data as described above.

Hereinabove, a process flow in which the PC establishes a screen transfer communication channel to the projector in an initial state according to "infrastructure connection" and performs a screen transfer operation has been described. A connection reception process subsequent to this corresponds to the flow described in FIG. 6B as described above.

In this example, the process when the projector 200 has received a connection request for establishing a communication channel from another PC after a communication channel was established with the PC 100 according to "infrastructure connection" will be described.

In S606, the CPU 201 of the projector 200 determines whether the connection request is received according to "infrastructure connection" or "wireless direct connection" based on the network IF that has received the connection request similarly to S600. The flow proceeds to S607 if the request was received according to "infrastructure connection" and proceeds to S608 if the request was received according to "wireless direct connection."

In S607, the CPU 201 of the projector 200 transmits a response to accept connection to the network IF of the PC that transmitted the connection request and completes the process. Since the PC having received the response to accept the connection can participate in the session to which the projector belongs, a GUI illustrated in FIG. 4C is displayed. That is, when the connection method of the communication channel is the same as the connection method designated in the connection request (S606: Infrastructure connection), the CPU 201 accepts connection to a communication channel of the information processing device that transmitted the connection request (S608).

In S608, the CPU 201 of the projector 200 transmits a response to reject connection to the network IF of the PC that transmitted the connection request and completes the process. That is, when the connection method of the communication channel is different from the connection method designated in the connection request (S606: Wireless direct connection), the CPU 201 rejects connection to a communication channel of the information processing device that transmitted the connection request (S607).

In this case, the information processing device may display a notice on the GUI of FIG. 4B, indicating that the connection was rejected since the connection method of an existing communication channel that has been established between a display device and an information processing device is different from the connection method designated in the connection request for connection to the communication channel. That is, the PC having received the response to reject the connection has already selected an IP address of a connection target projector on the GUI of FIG. 4B. Thus, a notice that establishment of a communication channel has failed since the projector has already established a communication channel according to "infrastructure connection" may be displayed on the GUI.

Hereinabove, a specific example of a process of receiving a connection request for connection to a communication channel which is already established between an information processing device (the PC 100) and a display device (the projector 200) on a network from another information processing device (the PC) connected to the network. The CPU 201 controls connection to a communication channel of an information processing device that transmitted a connection request based on the connection method of the communication channel and the connection method designated in the connection request. In the above example, the connection method of the communication channel is infrastructure connection.

When all PCs having established a screen transfer communication channel with a projector which has established a communication channel according to "infrastructure connection" cancel the communication channel, the projector 200 returns to an initial state. In this case, the projector 200 waits for any connection method, "infrastructure connection" or "wireless direct connection."

As a second example, a communication process flow in which the PC 100 transfers a screen to the projector 200 according to "wireless direct connection" will be described with reference to FIG. 3B.

Upon receiving an activation instruction from the user, the screen transfer program running on the PC 100 displays the GUI illustrated in FIG. 4A and waits for the input of an instruction as to whether a communication channel with the projector is to be established according to "infrastructure connection" or "wireless direct connection." In this example, it is assumed that the user presses a button 401 to input an instruction to establish the communication channel with the projector according to "wireless direct connection."

As described in the communication process flow in which the PC 100 transfers a screen to the projector 200 according to "infrastructure connection," a projector in an initial state before a communication channel is established projects the OSD illustrated in FIG. 5A.

In S311, the CPU 201 of the projector 200 controls the wireless LAN network IF 210 having an access point function to transmit a beacon signal. The beacon signal includes identification information such as a SSID or an encryption scheme. In this way, the PC 100 within the reach of the beacon signal can understand that a local network for performing communication with the projector 200 is generated. The CPU 101 of the PC 100 displays a GUI illustrated in FIG. 4D according to the information in the received beacon signal.

The GUI of FIG. 4D includes an area 413 in which SSIDs are displayed in a list form based on the received beacon signal. In this GUI, the user can input an instruction to designate a target projector to which a screen is to be transferred by selecting a SSID of the target projector. The projector 200 displays the OSD illustrated in FIG. 5A and the SSID of the projector is displayed in the OSD. Thus, the user may check the SSID on the projection screen of the target projector to which the user wants to transfer a screen and then select the SSID of the target projector in the GUI of FIG. 4D. In this example, to simplify the description, it is assumed that the projector 200 that possesses the SSID "PJ_ABCDE" is selected.

In S312, authentication is conducted between the PC 100 and the projector 200. In this example, the projector 200 sends an authentication response in response to an authentication request from the PC 100.

In S313, wireless connection is performed between the PC 100 and the projector 200. In this example, the projector 200 sends an association response in response to an association request from the PC 100, and frame exchange, parameter negotiation, AID (association ID) allocation, and the like are performed. In this way, the wireless connection between the PC 100 and the projector 200 is completed.

In S314, the CPU 201 of the projector 200 calculates an IP address to be assigned to the PC 100 to allow the PC 100 to communicate with the projector and notifies the PC 100 of the IP address by controlling the wireless LAN network IF 210. The CPU 101 of the PC 100 receives the IP address with the aid of the wireless LAN network IF 110 and allocates the IP address to the wireless LAN network IF 110. In this example, the IP address is "192.168.253.1." After that, the PC 100 and the projector 200 can communicate on a TCP/IP level.

In S315, a connection process for establishing a screen transfer communication channel is performed similarly to S302. Specifically, the CPU 101 of the PC 100 control the wireless LAN network IF 110 to transmit a connection request to the wireless LAN network IF 210 of the projector 200. The projector 200 performs the connection reception process illustrated in FIG. 6A with the aid of the CPU 201 and control the wireless LAN network IF 210 to transmit a response to the network IF of the PC that transmitted the connection request.

Here, a connection reception process when a projector has received a connection request from a PC according to "wireless direct connection" in an initial state (a state in which a screen transfer communication channel is not established with the PC) will be described in detail with reference to FIG. 6A.

First, since the wireless LAN network IF 210 has received the connection request, the CPU 201 of the projector 200 determines in S600 that the connection request is received according to "wireless direct connection" and proceeds to S604.

In S604, the CPU 201 of the projector 200 projects an OSD illustrated in FIG. 5C by controlling the projection control unit 207 and proceeds to S605. With the information displayed on the OSD of FIG. 5C, it is possible to present information that the connection method acceptable to the projector is "wireless direct connection" only. In this example, the OSD of FIG. 5C is displayed when a display device (the projector) has received a connection request from an information processing device (the PC) according to infrastructure connection before the display device and the information processing device establish connection according to wireless direct connection. However, the OSD of FIG. 5C may be displayed as information on a connection method applicable to a device which is not connected to a communication channel when the communication channel is already established between a display device and an information processing device on a network according to wireless direct connection.

Figure 6C:
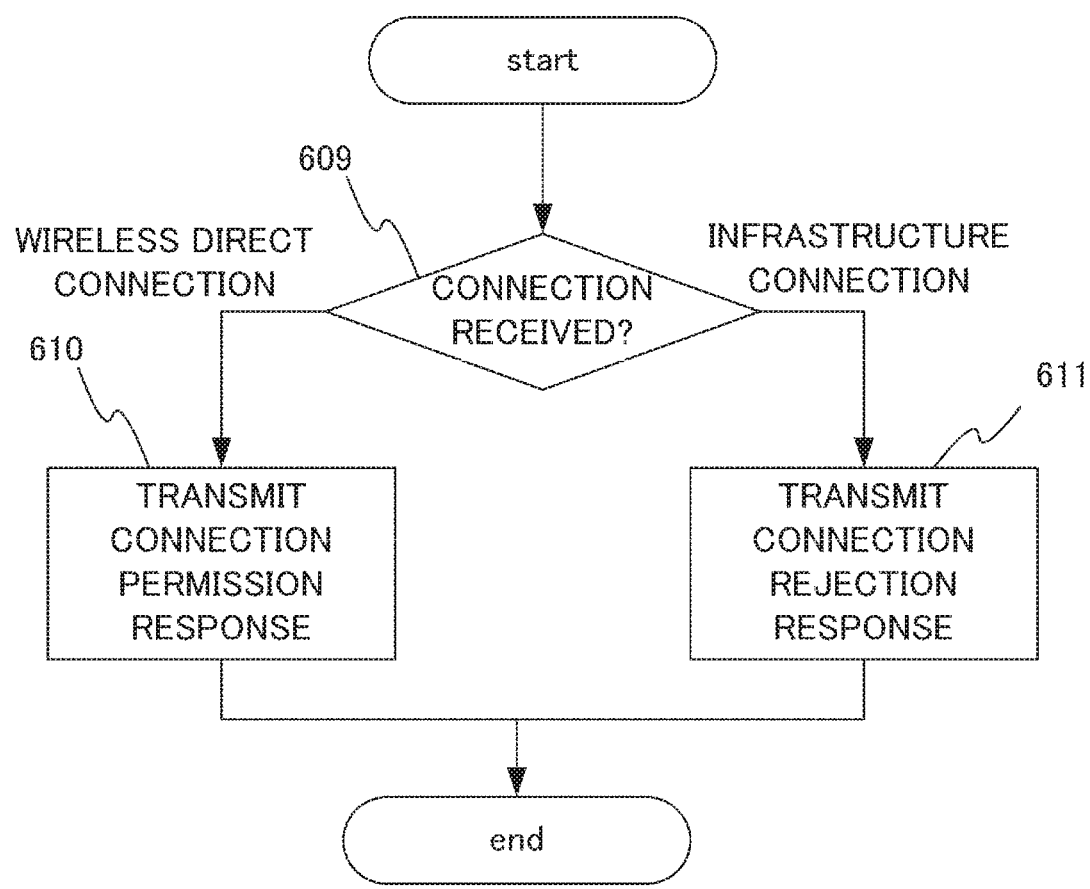

In S605, the CPU 201 of the projector 200 performs control to switch a connection reception process to the process of FIG. 6C when a connection request is received from a PC in the future. In S603, the CPU 201 transmits a response to accept connection as to the connection request received from the PC in S600 to a network IF (in this example, the wireless LAN network IF 110 of the PC 100) that transmitted the connection request and completes the process. With the above process, a logical group (a session) for performing a screen transfer operation is established between the PC 100 and the projector 200.

The description will be continued by returning to FIGS. 3A and 3B. After a connection process is completed in S315, the CPU 101 of the PC 100 displays the GUI illustrated in FIG. 4C.

The process of S316 is the same as that of S303 and the description thereof will not be provided.

Hereinabove, a process flow in which the PC establishes a screen transfer communication channel to the projector in an initial state according to "wireless direct connection" and performs a screen transfer operation has been described. A connection reception process subsequent to this corresponds to the flow described in FIG. 6C as described above.

In this example, the process when the projector 200 has received a connection request for establishing a communication channel from another PC after a communication channel was established with the PC 100 according to "wireless direct connection" will be described.

In S609, the CPU 201 of the projector 200 determines whether the connection request is received according to "infrastructure connection" or "wireless direct connection" based on the network IF that has received the connection request similarly to S600 and S606. The flow proceeds to S610 if the request was received according to "infrastructure connection" and proceeds to S611 if the request was received according to "wireless direct connection."

In S610, the CPU 201 of the projector 200 transmits a response to accept connection to the network IF of the PC that transmitted the connection request and completes the process. Since the PC having received the response to accept the connection can participate in the session to which the projector belongs, the GUI illustrated in FIG. 4C is displayed.

In S611, the CPU 201 of the projector 200 transmits a response to reject connection to the network IF of the PC that transmitted the connection request and completes the process. The PC having received the response to reject the connection has already selected a SSID of a connection target projector on the GUI of FIG. 4D. Thus, a notice that establishment of a communication channel has failed since the projector has already established a communication channel according to "wireless direct connection" may be displayed on the GUI.

Hereinabove, a process when a connection request is received from another PC after a communication channel was established between an arbitrary PC and a projector according to "wireless direct connection" has been described.

When all PCs having established a screen transfer communication channel with a projector which has established a communication channel according to "wireless direct connection" cancel the communication channel, the projector 200 returns to an initial state. In this case, the projector 200 waits for any connection method, "infrastructure connection" or "wireless direct connection."

According to the configuration described above, it is possible to unifying a connection method within a network group that forms a screen transfer system. In this way, the occurrence of the state described in connection with the object of the present invention is suppressed. That is, the occurrence of a state in which, when an instruction to project the screen of the PC 100b using the projector 200b is issued, the instruction cannot be executed since the PC 100b cannot communicate with the projector 200b is suppressed. This is because the PC 100b is rejected when the connection request is issued to the projector 200a. According to the configuration of Embodiment 1, even when a projector is added to a session by a PC having participated in the session, all PCs belonging to the session can communicate with the projector. In this way, the occurrence of a state in which a display device and an image output device cannot communicate with each other is suppressed.

In Embodiment 1, although both the cable LAN network IF and the wireless LAN network IF are active in the initial state of the projector 200, the cable LAN network IF only may be active. In this case, the projector 200 in the initial state can present information that the wireless LAN network IF thereof is inactive and "wireless direct connection" cannot be accepted by projecting an OSD illustrated in FIG. 5D.

Moreover, the wireless LAN network IF only may be active. In this case, the projector 200 in the initial state can present information that the cable LAN network IF thereof is inactive and "infrastructure connection" cannot be accepted by projecting an OSD illustrated in FIG. 5E.

In the embodiment, a projector has been illustrated as an example of a display device which is connected to a network and can establish a communication channel with an information processing device according to a plurality of connection methods and which receives image data from an information processing device with which a communication channel has been established and displays an image. However, the display device is not limited to the projector, but may be a liquid crystal display, an organic EL display, a MEMS shutter display, or the like.

A device that controls a display process and a device that controls a communication process may be included in the same casing as illustrated in FIG. 2 and may be separate devices. For example, a communication device may be detachably attached to a display device such as a projector.

The information processing device is not limited to the PC, but a mobile phone, a so-called tablet device, and the like may be used, for example.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-056737, filed on Mar. 19, 2015, which is hereby incorporated by reference herein in its entirety.

What is claimed is:

1. A communication device which is connected to a network and can communicate with an external device, the communication device comprising:
a processor; and
at least one communication interface,
wherein the processor is configured to function as following unit:
    a receiving unit that receives a connection request from an external device via the at least one communication interface;
    a determining unit that determines whether the connection request that the receiving unit receives is a connection request of a first connection method or a second connection method different from the first connection method; and
    a control unit that performs control such that
        (1) in a case where no connection has been established between the communication device and another device and the receiving unit receives a connection request of the first connection method or a connection request of the second connection method from the external device, the external device is connected to the communication device by a connection method based on the connection request;
        (2) in a case where a connection based on the first connection method has been established between the communication device and another device and the receiving unit receives a connection request of the second connection method from the external device, connection based on the connection request from the external device is not performed;
        (3) in a case where a connection based on the first connection method has been established between the communication device and another device and the receiving unit receives a connection request of the first connection method from the external device, connection based on the connection request from the external device is performed;
        (4) in a case where a connection based on the second connection method has been established between the communication device another device and the receiving unit receives a connection request of the second connection method from the external device, connection based on the connection request from the external device is performed; and
        (5) in a case where a connection based on the second connection method has been established between the communication device and another device and the receiving unit receives a connection request of the first connection method from the external device, connection based on the connection request from the external device is not performed, wherein
    the receiving unit receives, after the external device has been connected based on the first connection method or the second connection method, image data from the external device via the communication interface.

2. The communication device according to claim 1, further comprising:
a display that displays an image based on the image data received by the receiving unit.

3. The communication device according to claim 2, wherein
the display is a projector that projects the image based on the image data.

4. The communication device according to claim 2, wherein
the display displays information on a connection method for connection established between the external device and the communication device as information on a connectable connection method.

5. The communication device according to claim 2, wherein
the display displays information on the first connection method and information on the second connection method as information on connectable connection methods in a case where no connection is established between the external device and the communication device.

6. The communication device according to claim 1, wherein
the first connection method and the second connection method include cable LAN-based connection and wireless LAN-based connection.

7. A method of controlling a communication device, having at least one communication interface, which is connected to a network and can communicate with an external device,
the method comprising:
receiving a connection request from an external device via the at least one communication interface;
determining whether the connection request received in the receiving step is a connection request of a first connection method or a second connection method different from the first connection method; and
performing control such that;
(1) in a case where no connection has been established between the communication device and another device and the connection request received in the receiving step is a connection request of the first connection method or a connection request of the second connection method from the external device, the external device is connected to the communication device by a connection method based on the connection request;
(2) in a case where a connection based on the first connection method has been established between the communication device and another device and the connection request received in the receiving step is a connection request of the second connection method from the external device, connection based on the connection request from the external device is not performed;
(3) in a case where a connection based on the first connection method has been established between the communication device and another device and the connection request received in the receiving step is a connection request of the first connection method from the external device, connection based on the connection request from the external device is performed; and
(4) in a case where a connection based on the second connection method has been established between the communication device and another device and the connection request received in the receiving step is a connection request of the second connection method from the external device, connection based on the connection request from the external device is performed; and
(5) in a case where a connection based on the second connection method has been established between the communication device and another device and the connection request received in the receiving step is a connection request of the first connection method from the external device, connection based on the connection request from the external device is not performed,
receiving, after the external device has been connected based on the first connection method or the second connection method, image data from the external device via the communication interface.

8. A non-transitory computer-readable storage medium storing a computer-executable program for causing a computer to function as following units of a communication device, having at least one communication interface, which is connected to a network and can communicate with an external device:
a receiving unit that receives a connection request from an external device via the at least one communication interface;
a determining unit that determines whether the connection request that the receiving unit receives is a connection request of a first connection method or a second connection method different from the first connection method; and
a control unit that performs control such that
(1) in a case where no connection has been established between the communication device and another device and the receiving unit receives a connection request of the first connection method or a connection request of the second connection method from the external device, the external device is connected to the communication device by a connection method based on the connection request;
(2) in a case where a connection based on the first connection method has been established between the communication device and another device and the receiving unit receives a connection request of the second connection method from the external device, connection based on the connection request from the external device is not performed;
(3) in a case where a connection based on the first connection method has been established between the communication device and another device and the receiving unit receives a connection request of the first connection method from the external device, connection based on the connection request from the external device is performed;
(4) in a case where a connection based on the second connection method has been established between the communication device and another device and the receiving unit receives a connection request of the second connection method from the external device, connection based on the connection request from the external device is performed; and
(5) in a case where a connection based on the second connection method has been established between the communication device and another device and the receiving unit receives a connection request of the first connection method from the external device, connection based on the connection request from the external device is not performed, wherein
the receiving unit receives, after the external device has been connected based on the first connection method or the second connection method, image data from the external device via the communication interface.

9. A display system in which an external device and a communication device are connected by a network,
the communication device comprising:
a processor; and
at least one communication interface,
wherein the processor is configured to function as following unit:
a receiving unit that receives a connection request from an external device via the at least one communication interface;
a determining unit that determines whether the connection request that the receiving unit receives is a connection request of a first connection method or a second connection method different from the first connection method; and a control unit that performs control such that;
- (1) in a case where no connection has been established between the communication device and another device and the receiving unit receives a connection request of the first connection method or a connection request of the second connection method from the external device, the external device is connected to the communication device by a connection method based on the connection request;
- (2) in a case where a connection based on the first connection method has been established between the communication device and another device and the receiving unit receives a connection request of the second connection method from the external device, connection based on the connection request from the external device is not performed;
- (3) in a case where a connection based on the first connection method has been established between the communication device and another device and the receiving unit receives a connection request of the first connection method from the external device, connection based on the connection request from the external device is performed;
- (4) in a case where a connection based on the second connection method has been established between the communication device and another device and the receiving unit receives a connection request of the second connection method from the external device, connection based on the connection request from the external device is performed; and
- (5) in a case where a connection based on the second connection method has been established between the communication device and another device and the receiving unit receives a connection request of the first connection method from the external device, connection based on the connection request from the external device is not performed, wherein the receiving unit receives, after the external device has been connected based on the first connection method or the second connection method, image data from the external device via the communication interface, and the external device includes a transmitter unit which transmits a connection request to the communication device and transmits image data to the connected communication device.

10. The communication device according to claim 1, wherein the second connection method is a connection method by which the communication device and the external device are connected directly via a wireless network.

* * * * *